Sept. 7, 1954 A. T. FISCHER 2,688,577
FLOCK-COATED THERMOPLASTIC SHEET MATERIAL
Filed Sept. 18, 1951

INVENTOR.
ALBERT T. FISCHER
BY
ATTORNEYS

Patented Sept. 7, 1954

2,688,577

UNITED STATES PATENT OFFICE 2,688,577

FLOCK-COATED THERMOPLASTIC SHEET MATERIAL

Albert T. Fischer, Cleveland, Ohio

Application September 18, 1951, Serial No. 247,043

6 Claims. (Cl. 154—49)

This invention relates to flock-coated thermoplastic sheet material. More particularly, the invention relates to flock-coated sheet material, which is thermoplastic at relatively low temperatures, and to its manufacture, and to decorative designs cut or otherwise formed from such material. These designs may include ornamental shapes and figures, symbols, and letters for the formation of monograms, with the flock-coated sheet material being of such structural character that said decorative designs may be easily, quickly and permanently secured, by the application of heat and pressure, to various articles, such as wearing apparel, bed and table linens, etc.

Heretofore efforts have been made to flock organosol sheet and film material. Such films however are not sufficiently thermoplastic at relatively low temperatures required when applying same to fabrics. The higher temperature required to make an organosol flow would be injurious to the fabrics to which the design or letters are applied, and it has been found that organosol films do not provide the needed adhesion between the film and the fabric and also between the organosol and the flocking material.

This invention has for its primary object the provision of flock-coated thermoplastic sheet material, which material and method are characterized by their simplicity and economy, by the attractiveness and durability of the sheet material produced or the decorative designs cut therefrom, and by the permanency and durability with which such designs can be secured to fabric articles and the like.

Another object of the invention is to provide a flock-coated thermoplastic sheet material which can be easily and readily applied to fabrics and other materials by heat and pressure and can be subjected to laundering or dry cleaning operations as conventionally practiced without injury to the material or its bond to the article of apparel.

Yet another object of the invention is to provide a flock-coated sheet material the colors of which will not fade, run or discolor during washing, ironing or cleaning after being applied by heat and pressure to fabric materials.

Another object of the invention is to provide ornamental shapes and figures, or letters from a flock-coated thermoplastic sheet material, which shapes and figures can be conveniently and readily permanently bonded to another surface, such as a sheet or fabric or a garment.

Further objects of the present invention, and certain of its practical advantages, will be referred to in or will be evident from the following description of flock-coated sheet material, which embody the present invention, reference being had to the accompanying drawing, in which.

Figure 1:
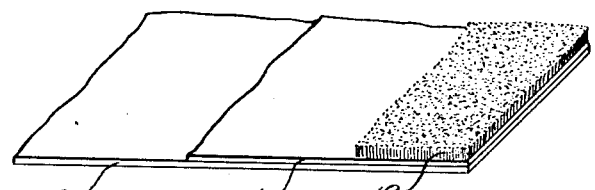
Fig. 1 is a perspective view of a flock-coated sheet material embodying the present invention, as made in accordance with the method of the invention.

Before specifically describing the flock-coated thermoplastic sheet material, and the decorative designs cut therefrom, which have been chosen for illustration, it is to be understood that the present invention is not limited to such illustrated embodiments. It also is to be understood that the terminology or phraseology herein used is for purposes of description and not of limitation, the scope of the present invention being denoted by the appended claims.

Briefly stated, the present flock-coated thermoplastic sheet material, from which various decorative designs can be die cut, stamped or otherwise formed, comprises a very thin or film-like base or foundation layer 10 of a suitable thermoplastic material, such as a vinyl resin, an adhesive layer 11 integrally united with one face of said base or foundation layer and composed of a material compatible therewith, such as a vinyl bonding material; and a layer of fibrous flock material 12 firmly secured to said adhesive and foundation layers.

In making the article of the invention, an adhesive layer 11 is applied to the foundation layer 10 as a liquid; applying a uniform layer of flock fibers to the adhesive coated foundation layer and baking the resultant mass to drive off the solvents and excess plasticizers, and bond the short fibers thereto.

Preferably, the base or foundation layer 10 is made from a polyvinyl chloride acetate resin, to which is added, to give the base or foundation layer extreme flexibility, a suitable amount of a plasticizer, such as dioctyl phthalate. It has been found that a composition consisting by weight of 73% polyvinyl chloride-acetate resin and 27% of dioctyl phthalate constitutes a quite satisfactory composition for the base or foundation layer 10, although it is to be understood that the present invention is not limited to one in which the base or foundation layer has that particular composition.

Usually the polyvinyl chloride-acetate resin for the layer 10 is made from about 87% of vinyl chloride and about 13% vinyl acetate for use in the foundation layer of the invention. Other specific plasticizers may be used in place of the dioctyl phthalate referred to and such plasticizers may comprise, for example, dibuty-phthalate and the percentage of plasticizer used in relation to the base resin may be varied, as desired, although it has been found that films made from the specific composition indicated have very desirable properties for the purpose described. Of course, the amount of plasticizer used varies the flexibility and softness of the layer made therefrom and the layer would still be very useful even though the plasticizer is varied appreciably from the quantities stated hereinabove.

As to the adhesive layer 11, it also may consist of polyvinyl chloride-acetate resin, to which is added a suitable synthetic rubber-like material, of which one example is a copolymer of butadiene and acrylic nitrile, and a suitable plasticizer such as dibutyl phthalate. One suitable composition for the adhesive layer 11 is 54% of a polyvinyl chloride-acetate resin, 26% of a butadiene acrylonitrile copolymer, and 20% of a dibutyl phthalate plasticizer, although it is to be understood, of course, that the present invention is not limited to such a specific composition for the coating layer 11.

Preferably the polyvinyl chloride-acetate resin is not used in less than 50% in the adhesive layer 11 and normally would not be used in excess of the quantities stated hereinbefore. This polyvinyl chloride-acetate resin in the adhesive layer usually comprises about 95% vinyl chloride and about 5% vinyl acetate. The butadiene acrylonitrile copolymer usually would comprise between about 20 to 30% of the adhesive layer and the remainder, approximately 20%, of the layer would be plasticizer.

To provide decorative designs suitable for use on wearing apparel, linens and other flexible articles, the base or foundation layer 10 of the present flock-coated sheet material is of film-like thinness and usually is about .002" or .006" in thickness. The layer 10 is made as a continuous sheet of appreciable width and of considerable length.

The adhesive material is applied in solution form to one face of said layer, and before the adhesive material hardens or sets in the heat bonding operations to which it is subsequently subjected, the flock material 12 is applied to said foundation layer in a conventional manner. The flock fibers should be of uniform length and usually are between ½ to 1 mil in length. Preferably the fibers are made from rayon as this material gives excellent refractive results, but cotton or other base material may be used.

Preferably when applying the adhesive material to the foundation layer 10, the foundation layer is at slightly higher than room temperature, such as 80° to 90° F. This adhesive material conventionally is applied to the foundation layer by a doctor knife or other suitable spreading equipment after which the flock material 12 is applied, as stated hereinbefore. Next the material being processed is passed through heating ovens or placed in a heated chamber, or is otherwise heated to a temperature of between about 175° to 225° F., and this bonds the adhesive material and foundation layer 10 and flock together and renders them a uniform mass the components of which cannot be separated from each other. Such heating drives off the solvents and excess plasticizers used and is continued until the material is dry and the heating period depends upon the amount of plasticizers and solvents present in the mixture, together with the color of the flock used.

As will be readily understood, upon the setting of the adhesive material 11, a strong, durable and unitary structure is provided, in which the adhesive material is integrally united with or bonded to the base or foundation layer 10 and in which the flock material is permanently anchored or secured to the adhesive material.

As will be readily understood, the decorative designs may be cut, stamped or otherwise formed from the present flock-coated sheet material and may be of an almost unlimited variety of shapes, such as ornamental shapes and figures, symbols, characters, initials and monograms, etc.

Figure 2:
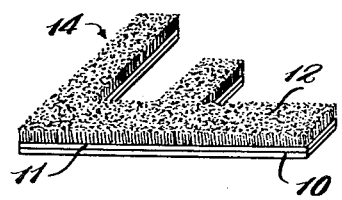
Fig. 2 is a perspective view of a decorative design, in the form of a letter, which has been cut from the present flock-coated sheet material.

Fig. 2 shows a decorative design or unit 14 in the form of the letter or initial "F" and the components of the sheet previously referred to are indicated in the drawing.

Figure 3:
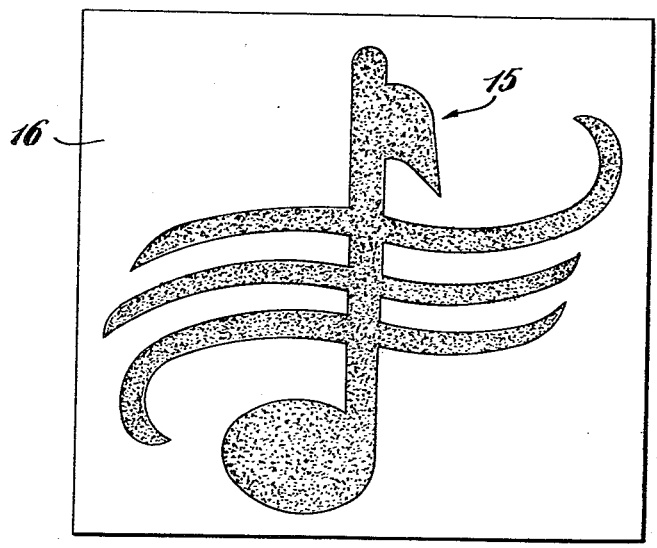
Fig. 3 is a plan view of another decorative design, in the form of a symbol, cut from the present flock-coated sheet material and applied on a suitable support.

Fig. 3 shows a decorative design 15 in the form of a musical note character, and the two designs 14 and 15 have been cut from a flock-coated sheet material embodying the present invention to illustrate articles that may be produced from such sheet material.

If desired, the decorative designs may be mounted on suitable supports, of cardboard, fabric or the like, such as the support 16, Fig. 3, for display or merchandizing purposes, although it is to be understood that the use of such mounting supports is not essential.

By the use of heat and pressure applied to designs such as 14 and 15, by electric irons or like devices now on the market, decorative designs formed from the present flock-coated sheet material, or the sheet itself can be readily and quickly secured, in a permanent and durable manner, to shirts, dresses and like wearing apparel, to bed and table linens, or to various other articles, preferably made from a fabric. As the result of the application of heat and pressure, the thermoplastic material of the base or foundation layer of the design or other article made from the material is caused to flow onto and around the fibers of the fabric articles and to adhere thereto firmly. There is thus provided a strong and durable union of the decorative designs and the fabric articles, a union which successfully will withstand the effects of washing liquids, ironing temperatures, dry cleaning solutions and the like.

In addition to serving as the means for the permanent and durable retention of the flock material 12, the adhesive layer 11 also serves as a barrier in preventing the flow of plastic material from the base or foundation layer 10 upwardly into the layer of flock material during the applying operation. Most thermoplastic materials normally migrate toward heat, but by reason of the specific characteristics of the adhesive layer 11, penetration of the underlying plastic material upwardly into the flock material 12, with attendant discoloration or other marring of such material is effectively prevented.

Since the foundation layer 10 is thermoplastic, it can be readily engaged with a desired article, usually fibrous, by applying the foundation layer of the flock-coated sheet material to the article and applying heat and pressure as described. Subsequent ironing will reinforce and strengthen the bond of the material to the article to which it is applied. The adhesive layer is less thermoplastic than the foundation layer to permit the foundation layer to be bonded to a fabric without impairing the bond of the flock to the sheet material of the invention.

An important feature of the invention resides in the butadiene-acrylonitrile material in the adhesive layer 11 since such material prevents the vinyl resin from penetrating the flock when a design article is applied to a member by applying heat as stated. This butadiene-acrylonitrile material serves as a barrier, it is thought, and prevents flow of the vinyl resin to the heat.

In the drawings, the layers 10 and 11 are shown as being separate to illustrate the steps of producing the flock-coated sheet material of the invention, although actually these layers became integral by bonding or flowing together in the production of the sheet material.

While one complete embodiment of the invention has been disclosed herein, it will be appreciated that modification of this particular embodiment of the invention may be resorted to without departing from the scope of the invention as defined by the appended claims.

Having thus described my invention, what I claim is:

1. A flock coated flexible sheet material comprising a thin flexible thermoplastic foundation layer, a thin flexible adhesive layer on one face of said foundation layer and integrally bonded to said foundation layer, and flocking material permanently united with said adhesive layer, said adhesive layer having a barrier material therein to render it less thermoplastic than said foundation layer to prevent migration of said thermoplastic foundation layer towards said flocking material on application of heat to said flocking material.

2. A flocked flexible sheet material comprising a thin flexible thermoplastic foundation layer, a thin flexible adhesive layer on one face of said foundation layer and united with said foundation layer, said foundation and adhesive layers comprising vinyl plastic materials but said adhesive layer being less thermoplastic than said foundation layer, and flocking material permanently united with said adhesive layer.

3. A flocked flexible sheet material comprising a thin flexible foundation layer, a thin flexible adhesive coating on one face of said foundation layer and integrally united therewith, said foundation layer and said coating being primarily polyvinyl chloride-acetate resins and said adhesive having butadiene acrylonitrile copolymer therein to make said adhesive coating less thermoplastic than said foundation layer, and fibrous flocking material permanently united with said adhesive material, whereby heat and pressure can be applied to said flocking material to render said foundation layer plastic for adhesion to a member without materially loosening the bond of said adhesive layer to said flocking material.

4. A flock coated flexible sheet material comprising a thin flexible foundation layer, a thin flexible adhesive layer on one face of said layer and integrally bonded to said foundation layer, flocking material united with said adhesive layer, a vinyl resin being present in said foundation layer, and a barrier material in said adhesive layer, which barrier material prevents flow of the resin in said foundation layer towards said flocking material when heat is applied to said flocking material.

5. A flocked flexible sheet material comprising a thin flexible thermoplastic foundation layer, a thin flexible adhesive layer on one face of said foundation layer and united with said foundation layer, said foundation and adhesive layers comprising vinyl plastic materials, and flocking material permanently united with said adhesive layer, said adhesive layer having a barrier material therein to render it less thermoplastic than said foundation layer to prevent migration of said thermoplastic foundation layer towards said flocking material on application of heat to said flocking material, whereby heat and pressure can be applied to said flocking material to render said foundation layer plastic for adhesion to a member without materially loosening the bond of said adhesive layer to said flocking material.

6. A thermoplastic flock coated sheet material adapted to be secured to another member and comprising a flexible, thermoplastic foundation layer made primarily from a polyvinyl chloride-acetate resin composed of about 87% polyvinyl chloride and about 13% polyvinyl acetate, a flexible thermoplastic vinyl resin adhesive layer integrally bonded to said foundation layer, and flock material bonded to said adhesive layer, said adhesive layer including a substantial quantity of butadiene acrylonitrile copolymer to render such layer less thermoplastic than said foundation layer.

References Cited in the file of this patent

UNITED STATES PATENTS

| Number | Name | Date |
|---|---|---|
| 2,567,327 | Ewing | Sept. 11, 1951 |
| 2,588,130 | Lemon et al. | Mar. 4, 1952 |